June 10, 1952 J. A. HOWENSTINE 2,599,554
DEVICE FOR FORMING BOWED FACE PLASTIC PANELS
Filed Dec. 30, 1949 2 SHEETS—SHEET 1

INVENTOR.
JAMES A. HOWENSTINE
BY Zugelter & Zugelter
Attys.

June 10, 1952 J. A. HOWENSTINE 2,599,554
DEVICE FOR FORMING BOWED FACE PLASTIC PANELS
Filed Dec. 30, 1949 2 SHEETS—SHEET 2
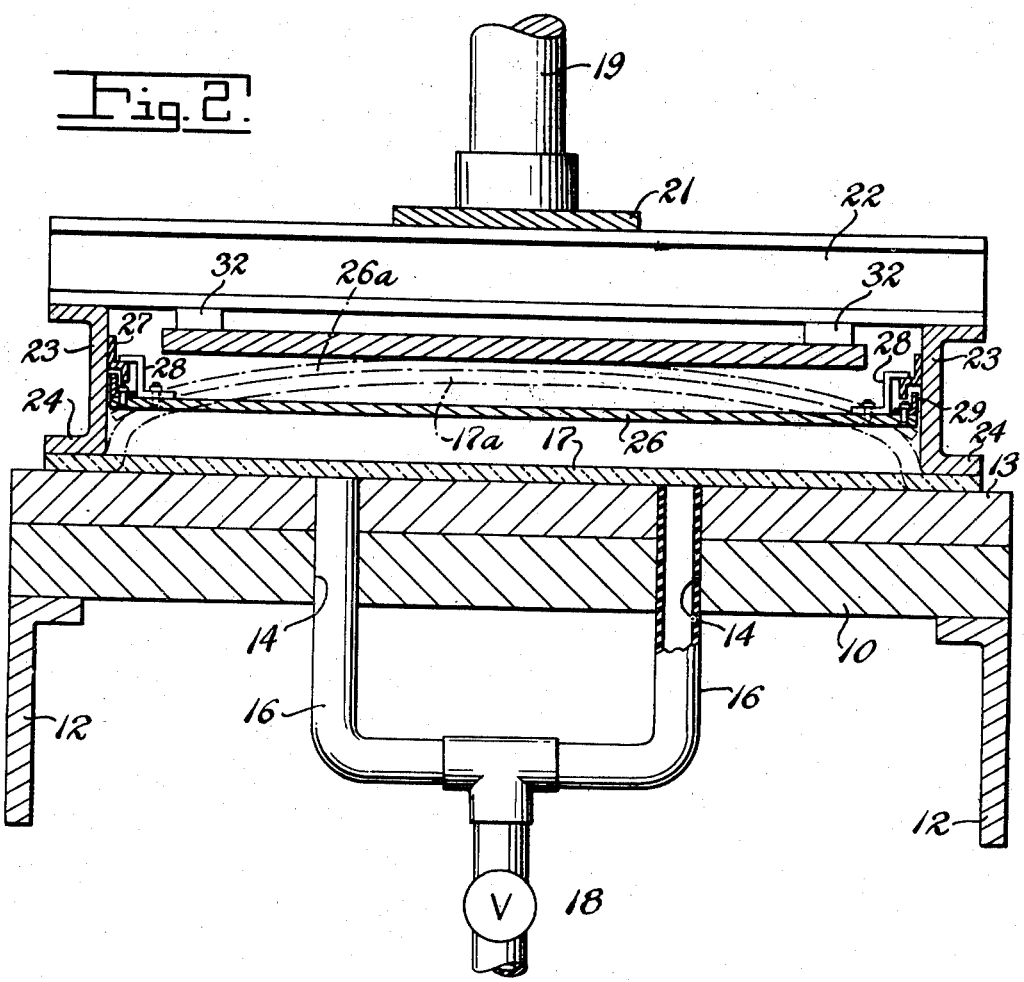
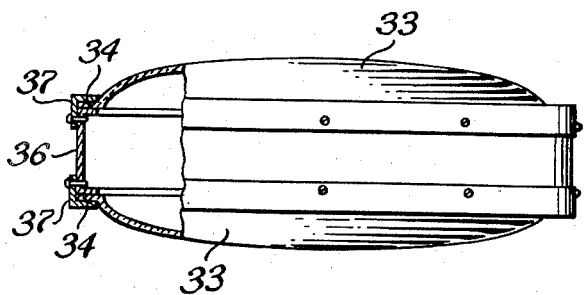
INVENTOR.
JAMES A. HOWENSTINE
BY
Zugelter & Zugelter
Attys.

Patented June 10, 1952

2,599,554

UNITED STATES PATENT OFFICE 2,599,554

DEVICE FOR FORMING BOWED FACE PLASTIC PANELS

James A. Howenstine, Lima, Ohio, assignor to Neon Products, Inc., Lima, Ohio, a corporation of Ohio Application December 30, 1949, Serial No. 136,116

5 Claims. (Cl. 18—19)

This invention relates to a device for forming panels of plastic material and, more particularly, this invention relates to a device for forming a bowed or dish-shaped panel.

Sign panels and the like, particularly those advertising sign panels which are displayed out of doors have to be strong and durable to withstand the rigors of inclement weather. The methyl methacrylate resins, commonly known as "lucite" and plexiglas" can readily be molded into pleasing decorative shapes. However, when formed into a panel having a substantially flat face, such plastic materials may be unsatisfactory because a thin sheet thereof may be unable to withstand adverse weather. A panel formed with a bowed face, however, is stronger than a panel having a flat face, and bowed face panels have been found to withstand the rigors of weather and wind better than flat faced panels.

An object of this invention is to provide a device which is inexpensive to construct and easy to use for forming a sheet of plastic material into a panel having a bowed face.

A convenient method of forming panels of "lucite" or "plexiglas" is by forcing a face of a sheet thereof against a mold by means of air pressure on the opposite face. A further object of this invention is to provide an inexpensive mold against which a sheet of plastic material may be forced by air pressure to form a bowed face.

A further object of this invention is to provide a mold which includes a resilient plate which can yield when a plastic sheet is pressed thereagainst, as by air or other fluid pressure, to form a dome shaped mold as the plastic sheet is pressed thereagainst.

A further object of this invention is to provide a mold carried by a ram which ram has a rim that can engage edges of a plastic sheet to hold edges of the sheet against a table while the plastic sheet is pressed against a resilient plate carried by the ram.

Briefly, this invention provides a device for forming plastic panels which includes a table, on which a sheet of plastic material may be supported, and a ram advanceable toward and away from the table. The ram carries a rim which can engage and hold edges of the sheet of plastic material against the table while air under pressure is directed through the table and against a face of the plastic sheet. The ram carries a resilient plate against which the plastic sheet is forced by the air pressure. Edges of the resilient plate are held parallel to the table and spaced a predetermined distance from the rim of the ram by means of appropriate hold-down strips attached to the ram so that when air pressure forces the plastic material against the resilient plate, the central portion of the resilient plate is bowed away from the table to form a dome shaped mold against which the plastic sheet is formed.

The above and other objects and features of the invention will in part be obvious and will in part be apparent from the following detailed description, and the drawings, in which:

Fig. 2 is a sectional view taken along a line II—II in Fig. 1;

Fig. 4 is a side elevational view, partly in section showing a sign construction employing two panels of the type illustrated in Fig. 3.

In the following detailed description and the drawings, like reference characters indicate like parts.

Figure 1:
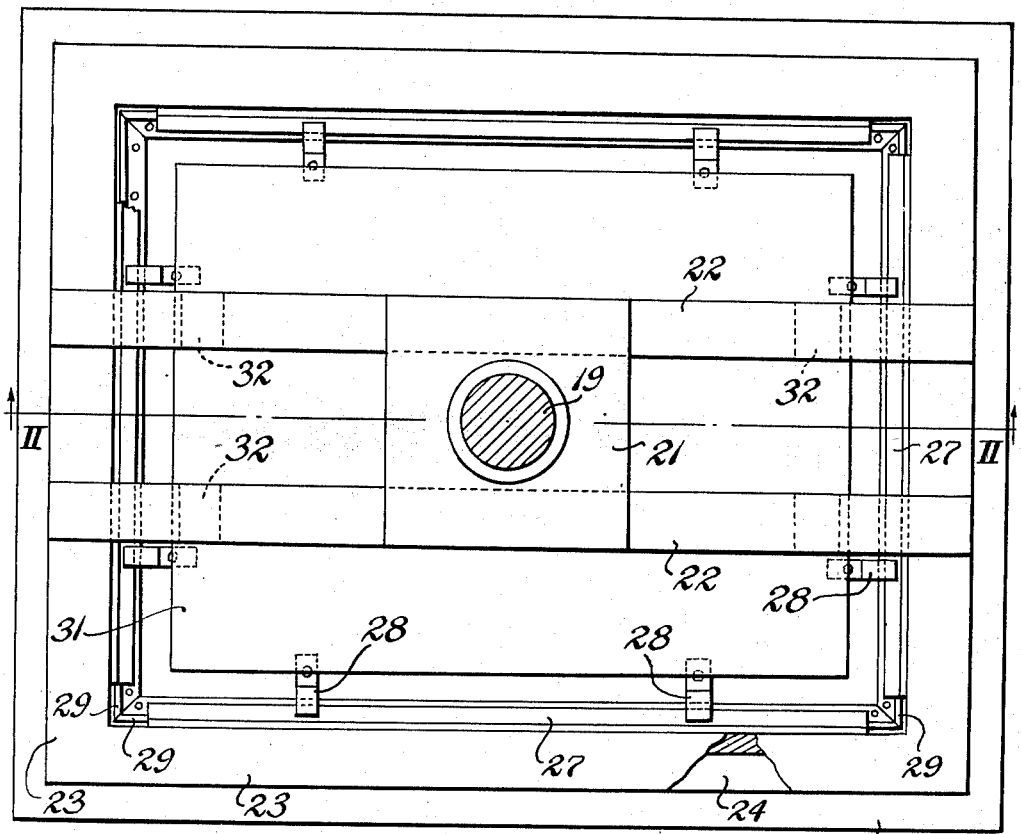
Figure 1 is a plan view, partly broken away and in section, of a device for forming plastic sheets, the device being constructed in accordance with an embodiment of this invention.

As shown in Figs. 1 and 2, the device includes a table 10 supported on appropriate leg members 12. A table top panel 13 formed of appropriate composition board of the type commonly known as "masonite" or the like covers the upper surface of the table 10. Passageways 14 are provided through the table 10 and the face panel 13 through which air hoses 16 extend so that air pressure may be applied to the underside of a sheet 17 of plastic material resting on the table. A valve 18 may be provided for controlling the supply of air to the air hoses 16.

The table 10, table top 13, and air hoses 16 are stationary members. A ram member is vertically reciprocable above the table. The ram member is carried by a shaft 19 which may be raised and lowered by means of an appropriate hydraulic unit or the like, not shown. The shaft 19 carries, at its lower end, a horizontal plate 21 to the bottom of which are attached I-beams 22. The I-beams 22 support the lower portion of the ram. Outwardly facing channel members 23 are carried by the I-beams 22. The I-beams 22 may be welded to the plate 21 and to the channels 23. The channels 23 form a hollow rectangular box structure, as shown in Fig. 1. Lower flanges 24 of the channels 23 can be advanced into engagement with the edges of the sheet of plastic material 17 to hold the edges of the sheet of plastic material against the face of the stationary table so that, when air under pressure is directed through the air hoses 16, the flanges 24 prevent displacement of edges of the sheet 17.

A resilient plate 26 is carried by the ram inside the channels 23. The resilient plate 26 may be formed of any appropriate sheet material which can be resiliently deformed to give a bowed or dome shape when the plastic sheet is forced thereagainst. The composition board commonly known as "masonite" is suitable for this purpose though other similar materials may be substituted therefor.

Figure 3:
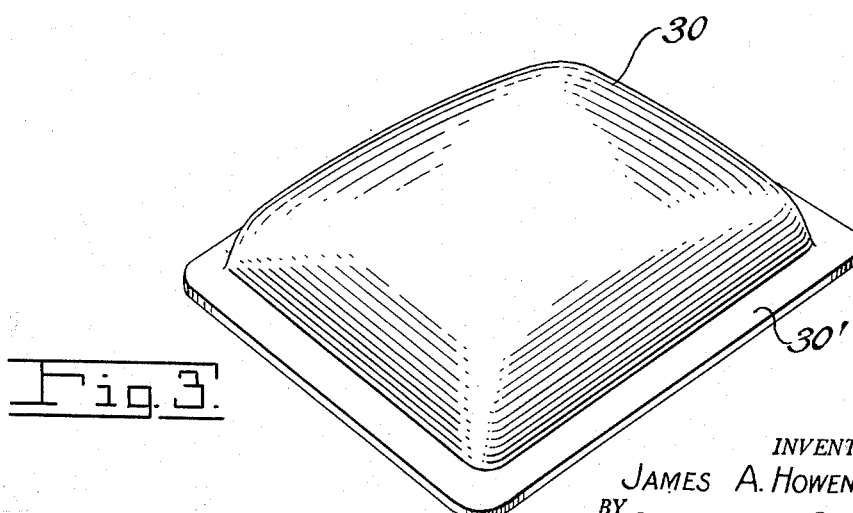
Fig. 3 is a perspective view showing a dome shaped panel of plastic material of the type formed in the device illustrated in Figs. 1 and 2.

Edges of the resilient plate 26 are held parallel to and spaced a predetermined distance from the rim flanges 24 by means of Z-shaped strips 27 attached to the inner walls of the webs of the channels 23. Cooperating Z-shaped hangers 28 attached to the upper side of the resilient plate 26 rest on the strips 27 to hold the resilient plate 26 in raised position. Angle members 29 are attached to the resilient plate outside the Z-shaped hangers 28 and on top of the resilient plate 26 in position to engage the Z-shaped strips 27 when the resilient plate 26 is raised slightly to hold down the edges of the resilient plate so that, when air under pressure is forced through the air hoses 16 against the lower face of the plastic sheet 17, the plastic sheet is forced upwardly against the resilient plate 26 to the position shown in dot-dash lines at 17a in Fig. 2 and the resilient plate 26 is bowed upwardly to the position shown in dot-dash lines at 26a. The plastic sheet may be heated before being placed in the device and, when the plastic material sets, the ram may be raised to lift the resilient plate 26 from the plastic sheet and the air pressure may be shut off whereupon the plastic sheet may be removed. The finished plastic panel formed from the sheet is provided with a bowed or dome shaped central portion 30, as shown in Fig. 3. A flat rim 30' surrounds the dome shaped central portion 30.

A stop plate 31 is attached to the I-beams 22 by means of supporting members 32. The stop plate is mounted parallel to the face of the table 10 and acts to limit the extent of deformation of the resilient plate so that the central portion thereof can be bowed upwardly only a limited amount and the panels formed in the device are given a uniform but not exaggerated domed shape. As shown in the drawings, the radius of the inner section of the panel is greater than the radius of the outer section thereof so that the greatest bowing is at the outer section where strength is most necessary.

In Fig. 4, a sign is illustrated in which two sign panels formed in the device of this invention are employed to form opposite faces of the sign. The panels are indicated at 33 in Fig. 4. Each of the panels is provided with a rim 34 by means of which the panel is held in place. A framework consisting of an annular U-shaped main frame member 36 forms the main supporting frame of the sign. Angle-shaped retainers 37 are attached to the edges of the frame member 36. One flange of each angle-shaped retainer is attached to the U-shaped body member while the other flange of each angle-shaped member is spaced outside one of the flanges of the main frame member so that a pair of inwardly extending slots are provided on opposite sides of the main frame member 36.

The rims 34 of the panels 33 fit into and are held in these slots, as clearly shown in Fig. 4. This type of sign framework is illustrated in more detail in the copending application of James A. Howenstine, Serial No. 89,743, filed April 26, 1949, now Patent No. 2,505,673. Appropriate sign indicia may be painted on the panels 33, and the sign may be hung with the panels 33 substantially vertical and with appropriate lighting units between the panels to form an illuminated sign. The indicia may be painted on the interior of the sign panels if the panels are of transparent material, such as a methyl methacrylate resin, and the panels protect the indicia from the weather.

The device illustrated in the drawings and described above is subject to structural modification without departing from the spirit and scope of the appended claims.

Having described my invention, what I claim as new and desire to secure by Letters Patent is:

1. In a device for forming a sheet of plastic material into a panel having a bowed face, the combination of a table having a face for supporting a flat sheet of plastic material, a ram advanceable toward and away from the face of said table, a peripheral rim carried by said ram adapted to engage and hold edges of the sheet of plastic material against the face of the table, a plate of resilient material carried by said ram inside the rim of the ram, means on the ram for holding edges of said resilient plate substantially parallel to the face of the table and spaced a predetermined distance from the rim of the ram, and means for projecting fluid under pressure through said table and against a face of the sheet of plastic material to force the sheet of plastic material into engagement with the resilient plate and cause the resilient plate to be deformed away from the table, whereby the sheet of plastic material is formed into a panel having a bowed face conforming to the deformed resilient plate.

2. In a device for forming a sheet of plastic material into a panel having a bowed face, the combination of a table having a face for supporting a sheet of plastic material, a ram advanceable toward and away from the face of said table, a peripheral rim carried by said ram adapted to engage and hold edges of the sheet of plastic material against the face of the table, a plate of resilient material carried by said ram inside the rim of the ram, means on the ram for holding edges of said resilient plate substantially parallel to the face of the table and spaced a predetermined distance from the rim of the ram, means for projecting fluid under pressure through said table and against a face of the sheet of plastic material into engagement with the resilient plate and cause the resilient plate to be deformed away from the table, whereby the sheet of plastic material is formed into a panel having a bowed face conforming to the deformed resilient plate, and a stop plate attached to said ram parallel to the face of the table inside the rim of the ram and on the opposite side of the resilient plate from the table, the stop plate being spaced from the resilient plate when the resilient plate is released, the stop plate being adapted to limit the deformation of the resilient plate.

3. In a device for forming a sheet of plastic material into a panel having a bowed face, the combination of a table having a face for supporting a flat sheet of plastic material, a ram advanceable toward and away from the face of said table, a peripheral rim carried by said ram adapted to engage and hold edges of the sheet of plastic material against the face of the table, a plate of resilient material carried by said ram inside the rim of the ram, a retainer strip having an inwardly directed flange attached to the ram inside of and spaced from the rim of the ram, and means for projecting fluid under pressure through said table and against a face of the sheet of plastic material to force the sheet of plastic material into engagement with the resilient plate and cause the resilient plate to be deformed away from the table, said retainer strip being adapted to engage edges of the resilient plate when the sheet of plastic material is forced against the resilient panel for maintaining edges of the resilient panel spaced a predetermined distance from the rim of the ram, whereby the sheet of plastic material is formed into a panel having a bowed face conforming to the deformed resilient plate.

4. In a device for forming a sheet of plastic material into a panel having a bowed face, the combination of a table having a face for supporting a flat sheet of plastic material, a ram advanceable toward and away from the face of said table, a peripheral rim carried by said ram adapted to engage and hold edges of the sheet of plastic material against the face of the table, a plate of resilient material carried by said ram inside the rim of the ram, a substantially peripheral retainer strip having an inwardly directed flange attached to the ram inside of and spaced from the rim of the ram, and means for projecting fluid under pressure through said table and against a face of the sheet of plastic material to force the sheet of plastic material into engagement with the resilient plate and cause the resilient plate to be deformed away from the table, said retainer strip being adapted to engage substantially the entire peripheral edge of the resilient plate when the sheet of plastic material is forced against the resilient panel for maintaining the peripheral edge of the resilient panel spaced a predetermined distance from the rim of the ram, whereby the sheet of plastic material is formed into a panel having a bowed face conforming to the deformed resilient plate.

5. In a device for forming a sheet of plastic material into a panel having a bowed face, the combination of a table having a face for supporting a flat sheet of plastic material, a ram advanceable toward and away from the face of said table, a peripheral flange carried by said ram, a peripheral rim carried on said flange adapted to engage and hold edges of the sheet of plastic material against the face of the table, a plate of resilient material carried by said ram inside the rim of the ram, a retainer strip attached to the inside of the flange of the ram and spaced from the rim of the ram, said retainer strip including an inwardly directed web and a flange on the inner side of said web and directed toward the table to form an annular slot between the flange of the ram and the flange of the retainer strip, an angle-shaped plate restraining strip between the retainer strip and the edge of the plate, one flange of the plate restraining strip being held in said slot, the other flange of the plate restraining strip engaging the resilient plate, means for holding the resilient plate away from the table to hold the first mentioned flange of the restraining strip in said slot, and means for projecting fluid under pressure through said table and against a face of the sheet of plastic material to force the sheet of plastic material into engagement with the resilient plate and cause the resilient plate to be deformed away from the table, said retainer strip being adapted to engage the restraining strip, to hold the edge of the resilient panel spaced a predetermined distance from the rim of the ram when the sheet of plastic material is forced against the resilient panel, whereby the sheet of plastic material is formed into a panel having a bowed face conforming to the deformed resilient plate.

JAMES A. HOWENSTINE.

REFERENCES CITED

The following references are of record in the file of this patent:

UNITED STATES PATENTS

| Number | Name | Date |
| --- | --- | --- |
| 1,798,199 | Gans | Mar. 31, 1931 |
| 1,933,866 | Mattman | Nov. 7, 1933 |
| 1,963,317 | Wilkinson | June 19, 1934 |
| 2,415,504 | MacDonald | Feb. 11, 1947 |
| 2,429,960 | Piperoux | Oct. 28, 1947 |